(12) United States Patent
Anschel et al.

(10) Patent No.: US 7,716,453 B2
(45) Date of Patent: May 11, 2010

(54) DESCRIPTOR-BASED MEMORY MANAGEMENT UNIT AND METHOD FOR MEMORY MANAGEMENT

(75) Inventors: Moshe Anschel, Kfar Saba (IL); Moshe Bachar, Tel Aviv-Yaffo (IL); Uri Dayan, Hertzelia (IL); Jacob Efrat, Kfar Saba (IL); Itay Peled, Herzelia (IL); Zvika Rozenshein, Kfar Saba (IL)

(73) Assignee: Freescale Semiconductor, Inc., Austin, TX (US)

( * ) Notice: Subject to any disclaimer, the term of this patent is extended or adjusted under 35 U.S.C. 154(b) by 495 days.

(21) Appl. No.: 11/575,001

(22) PCT Filed: Sep. 10, 2004

(86) PCT No.: PCT/EP2004/011079

§ 371 (c)(1),
(2), (4) Date: Mar. 9, 2007

(87) PCT Pub. No.: WO2006/027021

PCT Pub. Date: Mar. 16, 2006

(65) Prior Publication Data

US 2007/0277009 A1 Nov. 29, 2007

(51) Int. Cl.
*G06F 12/10* (2006.01)
(52) U.S. Cl. ........................................ 711/208; 711/159
(58) Field of Classification Search .................. None
See application file for complete search history.

(56) References Cited

U.S. PATENT DOCUMENTS 4,890,223 A 12/1989 Cruess et al.
5,053,951 A * 10/1991 Nusinov et al. .............. 711/206
5,469,556 A 11/1995 Clifton
5,926,841 A * 7/1999 Novak et al. ................. 711/208
6,430,664 B1 8/2002 Chauvel et al.
2004/0177269 A1 9/2004 Belnet et al.

FOREIGN PATENT DOCUMENTS

EP 0793179 A2 9/1997
EP 1215583 A1 6/2002

* cited by examiner

*Primary Examiner*—Kevin Verbrugge

(57) ABSTRACT

A memory management unit that includes: (i) multiple data segment descriptors, each data segment descriptor associated with a data memory segment; (ii) multiple program segment descriptors, each program segment descriptor associated with a program memory segment; and (iii) a controller, adapted to replace the content of the multiple data segment descriptors and the multiple program segment descriptors in response to a task switch. A method for memory management, the method includes: (i) providing multiple data segment descriptors; each data segment descriptor associated with a data memory segment, and providing multiple program segment descriptors, each program segment descriptor associated with a program memory segment; (ii) receiving and storing a program task identifier and a data task identifier; (iii) receiving a data access request and determining how to handle the data access request in response to a content of the multiple data segment descriptors; and (iv) receiving a program access request and determining how to handle the program access request in response to a content of the multiple program segment descriptors.

15 Claims, 4 Drawing Sheets providing multiple data segment descriptors; each data segment descriptor associated with a data memory segment, and providing multiple program segment descriptors, each program segment descriptor associated with a program memory segment
210 receiving a data access request and determining how to handle the data access request in response to a content of the multiple data segment descriptors
220 receiving a program access request and determining how to handle the program access request in response to a content of the multiple program segment descriptors
230 replacing the content of the multiple data segment descriptors and the multiple program segment descriptors in response to a task switch
240

DESCRIPTOR-BASED MEMORY MANAGEMENT UNIT AND METHOD FOR MEMORY MANAGEMENT

FIELD OF THE INVENTION

The present invention relates to a memory management unit and a method for memory management.

BACKGROUND OF THE INVENTION

Various configurations of memory management units are known in the art. Some configurations are illustrated in U.S. patent application 20020062427 of Chauvel et al., titled "Priority arbitration based on current task and MMU" and U.S. Pat. No. 5,835,962 of Chang, et al, titled "Parallel access micro-TLB to speed up address translation", both being incorporated herein by reference.

Modern processors access both cache memory modules and so caller higher level or external memory modules. The cache memory modules are usually accessed by virtual addresses while external memory modules are accessed by providing physical addresses. Typically, virtual addresses provided by a processor are translated to physical addresses by components other than the processor. U.S. patent application 20020082824 of Neiger al et., titled "virtual translation lookaside buffer"; U.S. patent application 20040117587 of Arimilli et al., titled "Hardware managed virtual-to-physical address translation mechanism" and U.S. patent application 20040143720 of Mansell, et al., titled "Apparatus and method for controlling access to a memory", all being incorporated herein by reference describe various address translation techniques. There is a need to provide an efficient memory management unit capable of performing an effective address translation In order to increase the reliability of systems various techniques were suggested. U.S. patent application 20030140245 of Dahan et al., titled "Secure mode for processors supporting MMU and interrupts", which is incorporated herein by reference, describes a system and method in which a secured operational mode is enabled. Another technique involves restricting access to various registers and also preventing a user form utilizing certain instructions, by defining multiple privilege levels. Typically, these levels include a user privilege level and a supervisor privilege level, the latter being higher than the former. There is a need to provide an efficient memory management unit capable of program protection and a method thereof.

Modern processors usually are capable of performing task switches. U.S. Pat. No. 6,542,991 of Joy et al., titled "Multiple-thread processor with single-thread interface shared among threads" which is incorporated herein by reference describes a task switching processor connected to a memory management unit. Typically, a task switch is time consuming and requires to exchange many control signals, information and the like over data and instruction buses. There is a need to provide an efficient memory management unit capable of performing an efficient task switch.

SUMMARY OF THE PRESENT INVENTION

A memory management unit that facilitates a fast hardware mechanism for translating virtual addresses to physical addresses. Conveniently, the memory management unit provides data and program access protection for multiple privilege levels (such as user privilege level, supervisor privilege level) and is capable of killing errant accesses. Characteristics of errant accesses can be programmed per task and/or per data memory segment or per instruction memory segment. The memory management unit is conveniently capable of providing various cache qualifier fields thus saving bus bandwidth in case of a task switch.

A memory management unit includes multiple data segment descriptors, each data segment descriptor associated with a data memory segment, multiple program segment descriptors, each program segment descriptor associated with a program memory segment; and a (iii) controller, adapted to replace the content of the multiple data segment descriptors and the multiple program segment descriptors in response to a task switch.

BRIEF DESCRIPTION OF THE DRAWINGS

The present invention will be understood and appreciated more fully from the following detailed description taken in conjunction with the drawings in which:

FIG. 4 is a flow chart of a method for memory management, according to an embodiment of the invention.

DETAILED DESCRIPTION OF PREFERRED EMBODIMENTS

Figure 1:
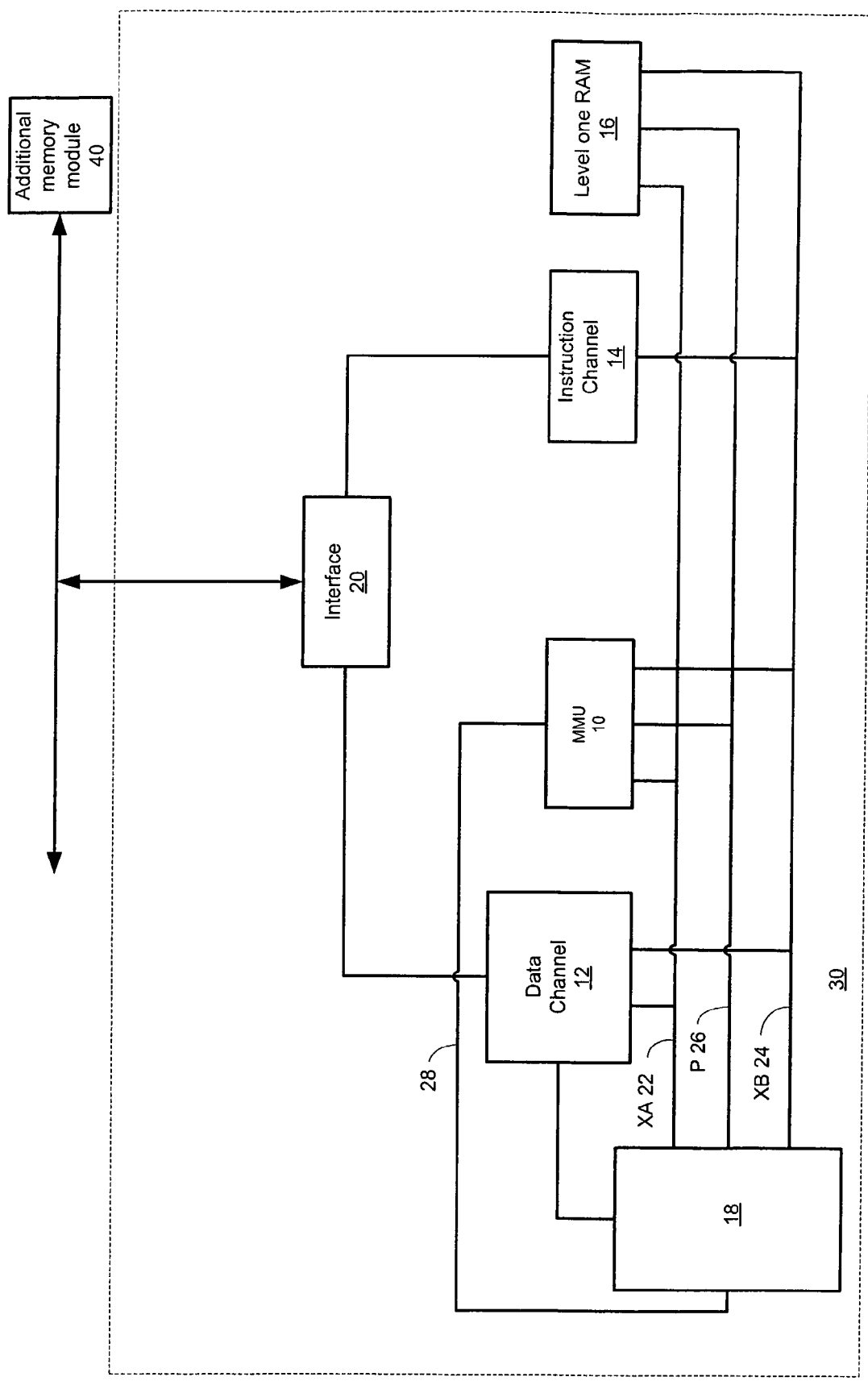
FIG. 1 is a schematic diagram of an apparatus, according to an embodiment of the invention.

FIG. 1 illustrates a memory management unit (MMU) 10 and its environment (collectively denoted 30), according to an embodiment of the invention. MMU 10 is conveniently a part of a system on chip that includes one or more processors, and conveniently is a part of a cellular phone, but this is not necessarily so.

The system on chip usually includes a peripheral bus that is connected to multiple peripherals devices such as I/O devices, audio and video devices, as well as memory modules.

The environment 30 includes a processor 18 that has two data buses XA 22 and XB 24 and an instruction bus P 26. Each of these data buses has data bits, address bits lines and control bits.

MMU 10 is connected to all three buses (XA, XB and P). The MMU 10 is further connected to the data channel 12 and to the instruction channel 14 and is further connected to processor 18 via line 28.

A data channel 12 is connected to buses XA 22 and XB 24. An instruction channel 14 that includes an instruction cache and additional components is connected to bus P 26. An internal memory such as level one RAM memory 16 is connected to data buses XA 22 and XB 24. The data channel 12, as well as the instruction channel 14, is connected, via interface 20, to additional components such as additional memory module 40. The data channel 12 includes a data cache, a write though buffer, a write back buffer and a data fetch unit for determining which component to service.

It is noted that the additional memory module can be a part of a multi-level cache architecture, whereas the data channel 12 includes a first level cache module and the additional memory is a level two cache memory. The additional memory module can also be a part of an external memory that is also referred to as a main memory.

Figure 2:
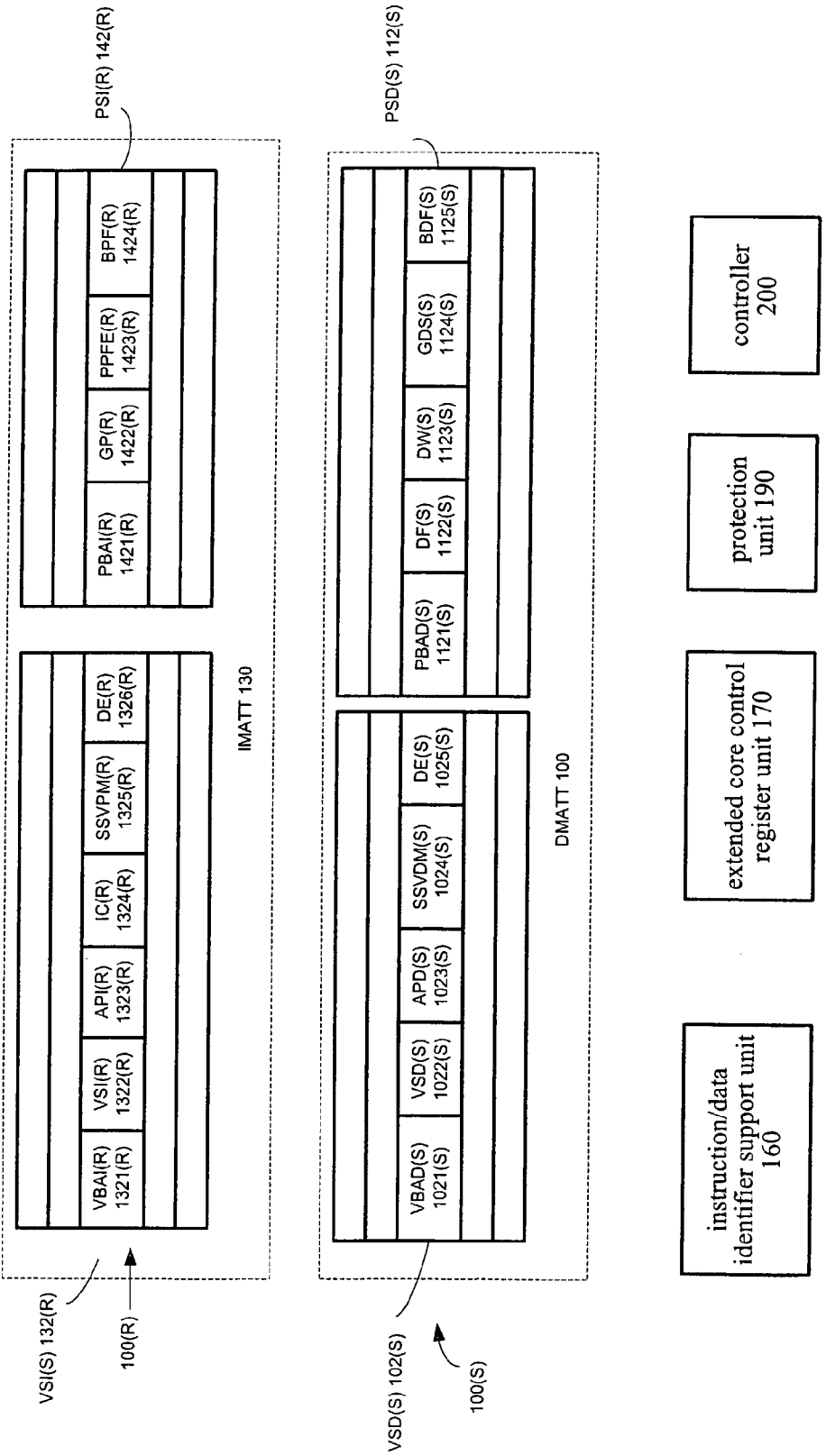
FIG. 2 is a schematic diagram of various components of a memory management module, according to an embodiment of the invention.

FIG. 2 illustrates the components of the memory management module 10, according to an embodiment of the invention. For simplicity of explanation the connection between the components and the connection between the components and various internal and external buses and lines is not illustrated.

MMU 10 includes a data memory attribute and translation table (DMATT) 100, an instruction memory attribute and translation table (IMATT) 130, an instruction/data identifier support unit 160, extended core control register unit 170, a protection unit 190 and a controller 200 that controls the operation of the various components.

DMATT 100 includes twenty entries 100(S), whereas the index S is a positive integer ranging between one and twenty. These twenty entries facilitate defining up to twenty different data memory regions, each data memory region having its unique memory characteristics and access rights. It is noted that DMATT 100 can include an additional default entry in addition to these twenty entries that can be used when the MMU is disabled or when a descriptor miss does not result in an access kill.

Each entry 100(S) includes a virtual segment data descriptor VSD(S) 102(S) and a related physical data segment descriptor PSD(S) 112(S). VSD(S) 102(S) includes a virtual data base address field VBAD(S) 1021(S), a data memory region size field VSD 1022(S), at least one data access permission field such as APD(S) 1023(S), a system/shared virtual data memory field SSVDM(S) 1024(S) and a descriptor enable bit DE 1025(S). SSVDM(S) 1024(S) that indicates if the data segment is defined as shared. For example, when two privilege level exist (such as user and supervisor) there can be two access permission fields.

PSD(S) 112(S) includes a physical data base address field PBAD(S) 1121(S) that relates to VSD(S), a data fetch policy indication field DF(S) 1122(S) that indicates if speculative fetch operations are allowed, a data write policy indication field DW(S) 1123(S), global data fields GD(S) 1124(S) that indicates that data accesses to this segment are issued to the system (environment) with a special attribute that enables an external system to activate its cache coherency snooper, and a data burst field BDF(S) 1125(S) that defines data burst sizes, typically in basic data units. The data write policies can include cacheable write-through, cacheable write-back, non-cacheable write-through and non-cacheable write-through with processor stall.

Conveniently, the virtual data base address is aligned to a multiple of the data memory region size that in turn equals a certain power of two. For example, the data memory region size can range between 256 bytes to 4 GB.

IMATT 130 includes twelve entries 130(R), whereas the index R is a positive integer ranging between one and twelve. These twelve entries facilitate defining up to twelve different instruction memory regions, each instruction memory region having its unique memory characteristics and access rights. It is noted that IMATT 130 can include an additional default entry in addition to these twenty entries that can be used when the MMU is disabled or when a descriptor miss does not result in an access kill.

Each entry 130(R) includes a virtual segment instruction descriptor VSI(R) 132(R) and a related physical instruction segment descriptor PSI(R) 142(R). VSI(R) 132(R) includes a virtual instruction base address field VBAI 1321 (R), an instruction memory region size field VSI(R) 1322(R), at least one instruction access permission field such as API(R) 1323 (R), instruction cacheability field IC(R) 1324(R) indicating if the memory segment is cacheable in the instruction cache, a system/shared virtual program memory field SSVPM(R) 1325(R) and a descriptor enable bit DE 1326(R). SSVPM(R) 1325 indicates if the program segment is defined as shared. For example, when two privilege level exist (such as user and supervisor) there can be two access permission fields.

PSI(R) 142(R) includes a physical instruction base address field PBAI(R) 1421(R) that is related to VSI(R), a global program field GP(R) 1422(R) that indicates that program accesses to this segment are issued to the system (environment) with a special attribute that enables an external system to activate its cache coherency snooper, a program pre-fetch line enable field PPFE(R) 1423(R) that enable a fetch unit associated with the instruction cache to perform speculative fetch operations (also referred to as pre-fetch operations), and a program burst field BPF(R) 1424(R) that defines program burst sizes, typically in basic data units.

Conveniently, the virtual instruction base address is aligned to a multiple of the memory region size that in turn equals a certain power of two. For example, the memory region size can range between 256 bytes to 4 GB.

Each entry of DMATT 100 and IMATT 130 is conveniently implemented by one or more registers.

Processor 18 has a user privilege level and a supervisor privilege level. The supervisor level allows execution of all instructions and access to all registers. Real time operation system (RTOS) kernels and services typically operate in this mode. User privilege level allows access to only a portion of the registers and allows execution of non-privileged instructions. User tasks and application programs typically operate at this level.

Data and instruction protection schemes are facilitated by multiple data access permission APD 1023(S) fields and multiple instruction access permission API 1323(R) fields, as well as various registers. The various registers are further illustrated in better detail in FIG. 3 and FIG. 4 and enable said protection as well as define protection criteria. Each APD(S) 1023(S) conveniently defines whether a supervisor level and/or user level read and/or write access is allowed to the s'th memory segment. Each API(R) 1323(R) conveniently defines whether a supervisor level and/or user level read access is allowed to the r'th instruction memory segment.

Each task is associated with a pair of data identifier (DID) and a program identifier (PIF). The DID is used by the data cache within the data channel 12 as a part of an extended tag while the PID is utilized in a same manner by an instruction cache within the instruction channel 14. These PID/DID allow supporting multiple tasks in an efficient manner and also define shared data and shared instruction regions.

Conveniently, if MMU 10 determines that a certain data is shared data it can force the data cache to alter the DID associated with data to a predefined DID (such as zero) indicating that the data is shared. The same applies to the PID and to the instruction cache.

The instruction/data identifier support unit 160 includes an instruction identifier register 162 for storing PID and also includes a data identifier register 164 for storing DID.

The protection unit 190 compares received data (program) access permission fields to received information about the privilege level and operations associated with a received data (program) access and determines if a privilege violation occurred.

Figure 3:
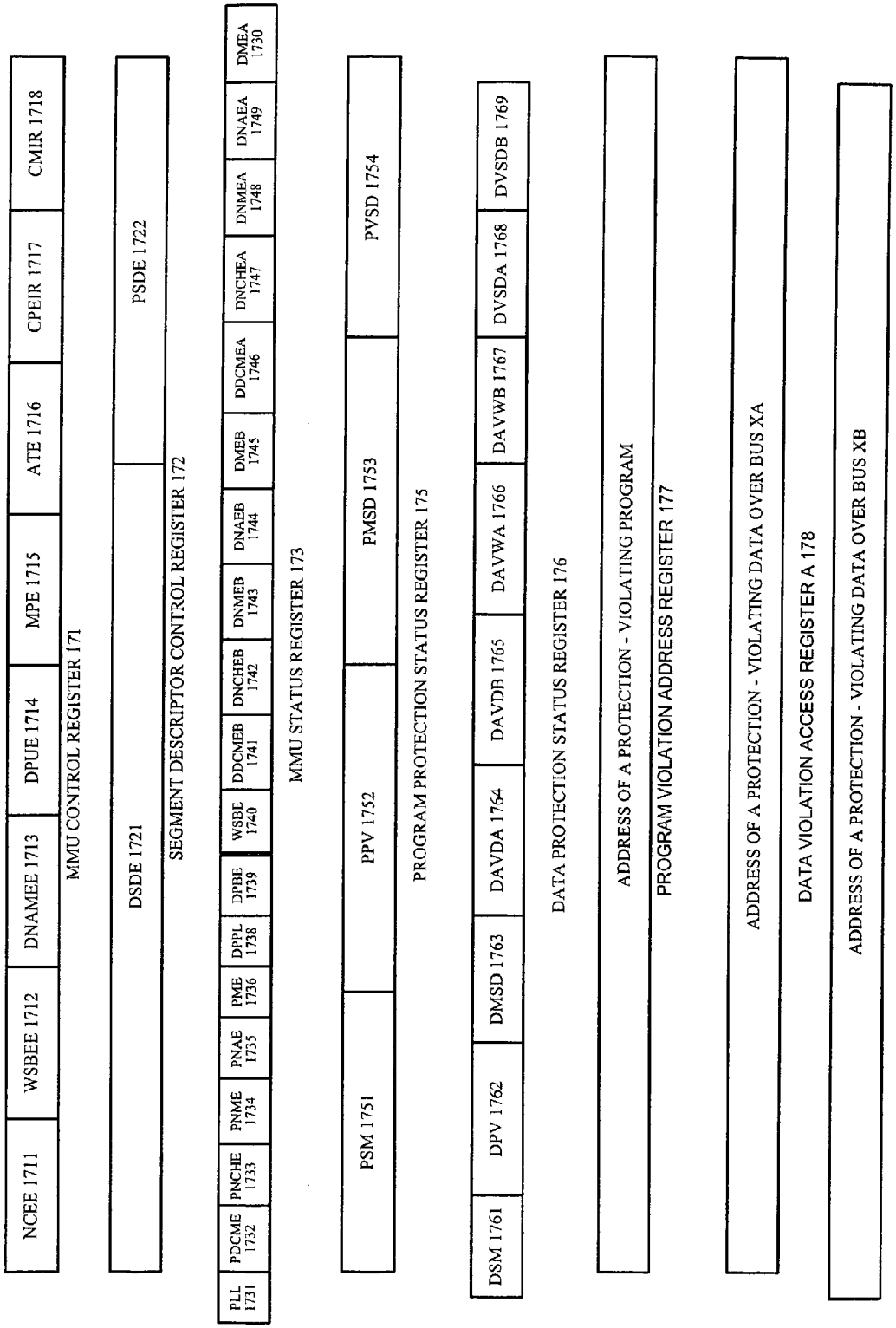
FIG. 3 is a schematic diagram of multiple registers of the memory management unit, according to an embodiment of the invention.

The extended core control register unit 170 includes multiple registers such as MMU control register 171, segment descriptor control register 172, MMU status register 173, program protection status register 174, program protection status register 175, program violation address register 176, two data violation access register 177 and 178, and peripherals error status register 182. These registers are illustrated in FIG. 3.

The MMU control register 171 includes the following fields: non-cacheable exception enable field NCEE 1711, write to the same byte exception enable field WSBEE 1712, data non-aligned memory exception enable field DNAMEE 1713, debug and profiling unit enable field DPUE 1714, memory protection enable field MPE 1715, address translation enable field ATE 1716, clear peripheral bus error interrupt request field CPEIR 1717 and clear MMU interrupt request field CMIR 1718.

NCEE 1711 allows enabling (or disabling) a non-cacheable exception. The exception occurs if an access generates a hit in the data cache or the instruction cache while the address is defined as not cacheable in its respective address segment descriptor. WSBEE 1712 allows enabling (or disabling) a same memory byte exception. The exception occurs when two data accesses (from XA and XB) attempt to write to the same byte in the internal memory during the same cycle. DNAMEE 1713 allows enabling (or disabling) a non-aligned memory exception. The exception occurs when the least significant bits of a data address are not aligned with the width of the data access.

DPUE 1714 enables (or disables) a debug and profiling unit that is a part of environment 30. MPE 1715 enables (or disables) the protection checking function of all enables segment descriptors. ATE 1717 enables (or disables) address translation mechanism. CPEIR 1718 is set when a peripheral bus error occurs. CMIR 1719 is set once an MMU error occurs.

The segment descriptor control register 172 includes twenty data segment descriptor enable bits (collectively denoted DSDE) 1721, and twelve instruction segment description bits (collectively denoted PSDE) 1722. Each bit enables (or disables) a certain segment descriptor.

The MMU status register 173 includes fields 1730-1749. The program privilege level field PPL 1731 indicates whether a program access causing an exception is in supervisor level or user level. The double program cache-match error field PDCME 1732, the data double cache match error B field DDCMEB 1741, and the data double cache match error A field DDCMEA 1746 indicate that an exception occurs due to an instruction double cache match, a data double cache match of bus XB or bus XA respectively. The program non-cacheable hit exception field PNCHE 1733, the data non-cacheable hit exception B field DNCHEB 1742 and the data non-cacheable hit exception field A DNCHEA 1747 indicate that an exception occurs due to an instruction non-cacheable hit in the instruction cache, a data non-cacheable hit on bus XB or on bus XA, respectively.

The program non-mapped memory access field PNME 1734, data non-mapped memory access error B field DNMEB 1743 data non-mapped memory access error A field DNMEA 1748 indicate that a program access, data access on bus XB or data access on bus XA, respectively, are to a non-mapped memory area.

The program non-aligned access error field PNAE 1735, data non aligned access exception B field DNAEB 1744 and data non aligned access exception A field DNAEA 1749 indicate that an exception occurred due to a non-aligned program access, data access on bus XB and data access on bus XA respectively.

The program MATT error field PME 1736 indicates that an exception is indicated in the IMATT 130. This can occur when as a result of a program protection violation, or when an error occurred in the programming of an instruction segment descriptor. The data MATT error on bus B field DEMB 1745 and data MATT error on bus A field DEMA 1730 indicate that an exception is identified in the DMATT 100. This may include violation of data protection as a result of a data access over bus XB or XA respectively. It may also indicate that an error occurred in the programming of an instruction segment descriptor or that an error occurred in the programming of the DMATT.

The MMU status register 173 also includes a data privilege level field DPL 1737 indicative of a privilege level of a data access causing an exception, a data peripheral privilege level field DPPL 1738 indicative of a privilege level of a data access on a peripheral bus causing an exception, data peripheral bus error field DPBE 1739 that indicates when an error occurs on a peripheral bus, and a write to same byte exception field WSBE 1740 indicates when the same byte in internal memory is written to/from both busses.

The program protection status register 175 includes the following fields: PSM 1751, PPV 1752, PMSD 1753 and PVSD 1754. The program segment miss field PSM 1751 is set when a program access does not match any of the enabled program segment descriptors. The program privilege violation PPV 1752 field is set when an address of a program access matches a stored program segment address but does not have sufficient permission. The program multiple segment descriptor hit field PMSD 1753 indicates when a program address matches multiple stored addresses. If PPV is set the serial number of the program segment that caused the violation is stored at PVSD 1754.

The data protection status register 176 includes the following fields: DSM 1761, DPV 1762, DMSD 1763, DAVDA 1764, DAVDB 1765, DAVWA 1766, DAVWB 1767, DVSDA 1768 and DVSDB 1769. The data segment miss field DSM 1761 is set when a data access does not match any of the enabled data segment descriptors. The data privilege violation field DPV 1762 is set when an address of a data access matches a stored data segment address but does not have sufficient permission. The data multiple segment descriptor hit field DMSD 1763 indicates when a data address matches multiple stored addresses. The data access violation direction on bus XA field DAVDA 1764 and data access violation direction on bus XB field DAVDB 1765 are set when data access violation on the XA bus or the XB bus respectively involves a write operation. The data access violation width on bus XA field DAVWA 1766 and data access violation width on bus XB field DAVWB 1767 indicate the width of the data access that caused the exception. If DPV is set the serial number of the data segment that was conveyed over bus XA or XB that caused the violation is stored at DVSDA 1754 or DVSDB 1755 respectively.

The program violation address register 177 stores an address of a protection-violating program. The two data violation access register 179 and 178 store the addresses of a protection violating data over buses XA and XB respectively.

The peripherals error status register 183 stores an address of data that caused an error on the peripheral bus.

DMATT 100 receives a data access request or an instruction access request, and its privilege level, compares it to the corresponding access permission field and is capable of sending an exception to the processor 18 that eventually kills the access.

If a privilege violation occurs the MMU can indicate that the task should be killed (for example by the processor). Typically, some instructions can be executed by the processor 18, at the interval between an initiation of a MMU exception and the service of the exception by processor 18.

FIG. 4 illustrates a method 200 for memory management, according to an embodiment of the invention. Various embodiments of the invention include omitting one or more stage, adding one or more stage or altering the content of each stage.

Some of the stages are optional. One skilled in the art will appreciate that the order of stages can vary, and that two or more stages that's are illustrated as being sequentially executed can be executed in parallel.

Method 200 starts by stage 210 of providing multiple data segment descriptors; each data segment descriptor associated with a data memory segment, and providing multiple program segment descriptors, each program segment descriptor associated with a program memory segment. Referring to the example set forth in previous FIG. 2, stage 210 may include providing a memory management unit that includes an IMATT 130 and a DMATT 100 that in turn include multiple virtual and physical segment descriptors.

Stage 210 is followed by stage 220 and 230, although stage 210 can be followed by only one of said stages, according to the received inputs to the process.

Stage 220 includes receiving a data access request and determining how to handle the data access request in response to a content of the multiple data segment descriptors. Referring to the example set forth in previous figures, stage 220 may include comparing information relating to a data access (such as DID, privilege level, read or write data access, data virtual address, and the like) to the content of one or more data segment descriptors. The comparison can result in an acceptance of the data access or a denial as well as an initiation of an MMU exception.

Stage 230 includes receiving a program access request and determining how to handle the program access request in response to a content of the multiple program segment descriptors. Referring to the example set forth in previous figures, stage 230 may include comparing information relating to a program access (such as PID, privilege level, program virtual address, and the like) to the content of one or more program segment descriptors. The comparison can result in an acceptance of the program access or a denial as well as an initiation of an MMU exception.

Stages 220 and 230 can be repeated one or more times, depending upon the program that is being executed, until they are followed by stage 240.

Stage 240 includes replacing the content of the multiple data segment descriptors and the multiple program segment descriptors in response to a task switch. Stage 240 can be followed by stage 220 and stage 230 or only one of them. The sequence of stages 210-240 can be repeated one or more times.

According to an embodiment of the invention, stage 210 includes storing a program task identifier and a data task identifier.

Stage 230 conveniently includes checking program access permission information stored in a program segment descriptor. Stage 220 conveniently includes checking data access permission information stored in a data segment descriptor.

Stage 210 may include selectively enabling at least one at least one data segment descriptor and at least one program segment descriptor. According to an embodiment of the invention the determinations made during stage 220 and/or 230 are responsive to the enables segment descriptors.

According to an embodiment of the invention stage 210 includes storing program address translation related information at the program segment descriptors, and storing data address translation related information at the data segment descriptors. Conveniently, said stored information is used when performing address translation during stages 220 and 230.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A memory management unit, comprising:
multiple data segment descriptors, each data segment descriptor associated with a data memory segment; multiple program segment descriptors, each program segment descriptor associated with a program memory segment; and
a controller, adapted to:
receive a data access request comprising a data virtual address;
select a first descriptor from the multiple data segment descriptors by comparing the data virtual address to a plurality of the multiple data segment descriptors;
accept or deny the data access request based on the first descriptor; and
replace the content of the multiple data segment descriptors and the multiple program segment descriptors in response to a task switch.

2. The memory management unit of claim 1 further comprising an instruction/data identifier support unit, for storing a program task identifier and a data task identifier.

3. The memory management unit of claim 1 whereas the program segment descriptors store program access permission information and the data segment descriptors store data access permission information.

4. The memory management unit of claim 1 wherein at least one data segment descriptor and at least one program segment descriptor are adapted to be selectively enabled.

5. The memory management unit of claim 1 wherein the data segment descriptors store data access permission information, data access write policy, data pre-fetch related information, and data fetch burst size.

6. The memory management unit of claim 1 wherein the data segment descriptors store data address translation related information and the program segment descriptors store program address translation related information.

7. A method for memory management, the method comprising:
providing multiple data segment descriptors; each data segment descriptor associated with a data memory segment, and providing multiple program segment descriptors, each program segment descriptor associated with a program memory segment;
receiving a data access request comprising a data virtual address;
selecting a first descriptor from the multiple data segment descriptors by comparing the data virtual address to a plurality of the multiple segment data descriptors; and
accepting or denying the data access request based on the first descriptor;
in response to accepting the data access request, determining how to handle the data access request in response to a content of the multiple data segment descriptors;
receiving a program access request and determining how to handle the program access request in response to a content of the multiple program segment descriptors; and
replacing the content of the multiple data segment descriptors and the multiple program segment descriptors in response to a task switch.

8. The method of claim 7 further comprising storing a program task identifier and a data task identifier.

9. The method of claim 7 wherein the stage of determining how to handle the program access request comprises checking program access permission information stored in a program segment descriptor; and whereas the stage of determining how to handle the data access request comprises checking data access permission information stored in a data segment descriptor.

10. The method of claim 7 further comprising selectively enabling at least one data segment descriptor and at least one program segment descriptor.

11. The method of claim 7 further comprising storing program address translation related information at the program segment descriptors, and storing data address translation related information at the data segment descriptors.

12. A method for memory management, comprising:
providing multiple data segment descriptors; each data segment descriptor associated with a data memory segment, and providing multiple program segment descriptors, each program segment descriptor associated with a program memory segment;
selectively enabling at least one data segment descriptor and at least one program segment descriptor;
receiving a data access request and determining how to handle the data access request in response to a content of the at least one enabled data segment descriptor;
receiving a program access request comprising a program virtual address;
selecting a first descriptor from the multiple program segment descriptors by comparing the program virtual address to a plurality of the multiple program segment descriptors; and
accepting or denying the program access request based on the first descriptor.

13. The method of claim 12 further comprising storing program address translation related information at the program segment descriptors, and storing data address translation related information at the data segment descriptors.

14. The method of claim 12 further comprising storing a program task identifier and a data task identifier.

15. The method of claim 12 whereas the determining how to handle the program access request comprises checking program access permission information stored in a program segment descriptor; and whereas the determining how to handle the data access request comprises checking data access permission information stored in a data segment descriptor.

* * * * *